Figures 1, 3:
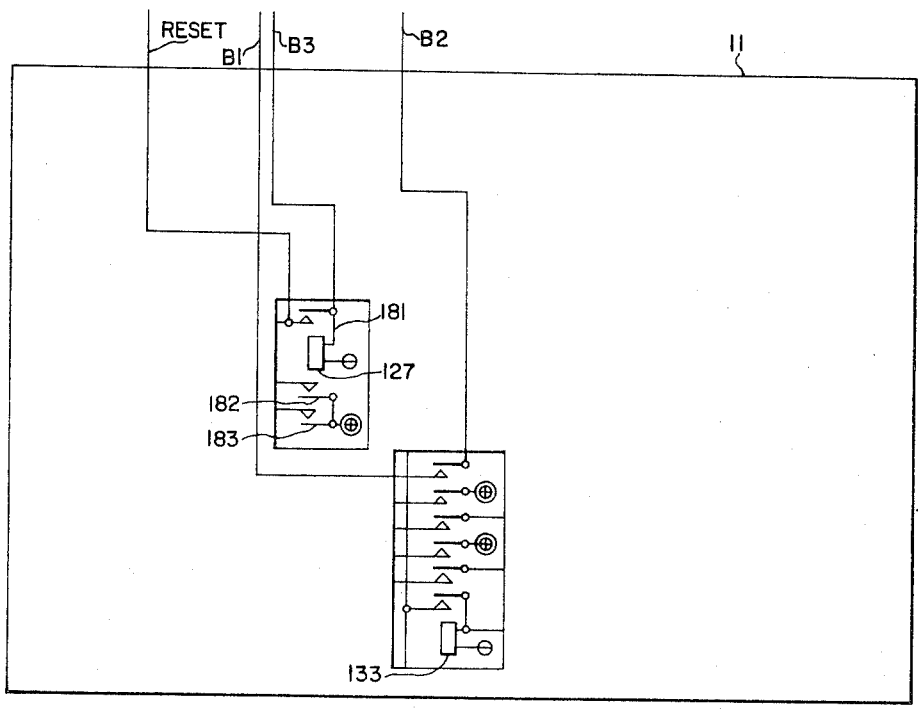

SAME AS FIG. 3. OF PATENT 2,091,301

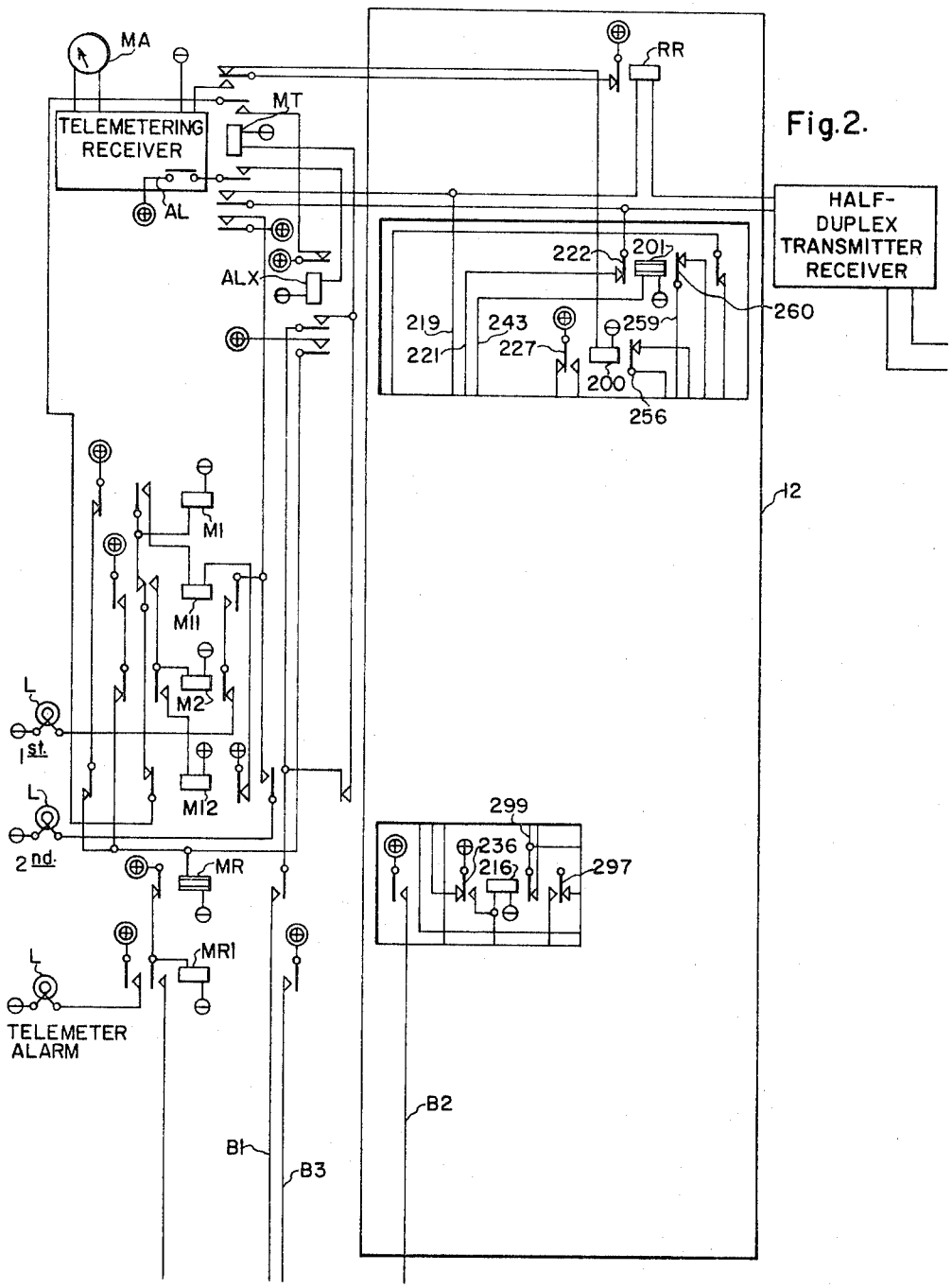

United States Patent Office 3,268,869
Patented August 23, 1966

3,268,869
SUPERVISORY CONTROL AND
TELEMETERING SYSTEM
William E. Furniss, Penn Hills, and Weldon L. Metz,
Churchill, Pa., assignors to Westinghouse Electric Corporation, Pittsburgh, Pa., a corporation of Pennsylvania
Filed Jan. 21, 1963, Ser. No. 252,796
5 Claims. (Cl. 340—163)

This invention relates, generally, to supervisory control and telemetering systems and, more particularly, to systems for performing both supervisory control and telemetering functions over a single communication channel of the half-duplex carrier type.

When supervisory control and telemetering are both transmitted over a common simple carrier channel, the supervisory control operations usually require preference or priority over the telemetering operations. Heretofore, telemetering of a duration-of-impuse type has been utilized in conjunction with supervisory control equipment on a common simple carrier channel. This type of telemetering permitted interruption by the supervisory control equipment between each cycle of telemetering information. However, telemetering of the duration-of-impulse type has a relatively slow response time. In view of the increasing complexity of power systems, it becomes more desirable to provide telemetering of a fast response type, such as frequency type telemetering, and also to provide preferential channel operation for the supervisory control equipment. Heretofore, this has not been feasible with a unidirectional half-duplex carrier channel which transmits in only one direction at a time.

An object of this invention is to provide for operating a frequency type telemetering system and a supervisory control system over a half-duplex carrier channel between a control station and a remote station.

Another object of the invention is to provide for connecting the telemetering apparatus to the channel for only a predetermined time interval, thereby maintaining the supervisory control as the prime user of the channel.

A further object of the invention is to provide for resetting the telemetering equipment and restoring the supervisory control to the channel for the immediate transmission to the control station of information concerning a change in condition of apparatus at the remote station.

Still another object of the invention is to provide for sequential telemetering of different quantities.

Other objects of the invention will be explained fully hereinafter or will be apparent to those skilled in the art.

In accordance with one embodiment of the invention, supervisory control apparatus and telemetering apparatus of the frequency type both utilize a carrier channel of the half-duplex type for transmitting information between a control station and a remote station. Normally, the supervisory control has preference. Upon selection of a telemetering function via the supervisory control, the channel equipment is transferred from the supervisory control equipment to the telemetering equipment for a time interval which is determined by timing relays. When the time interval expires, the channel is automatically transferred back to the supervisory control equipment. By way of illustration, the telemetering equipment is shown in conjunction with supervisory control equipment of the type described and illustrated in Boswau Patent No. 2,091,301, issued August 31, 1937. However, the present system may be utilized with supervisory control equipment of other types.

For a better understanding of the nature and objects of the invention, reference may be had to the following detailed description, taken in conjunction with the accompanying drawings in which FIGURES 1 to 4, inclusive, constitute a supervisory control and telemetering system embodying the principal features of the invention.

Figure 4:
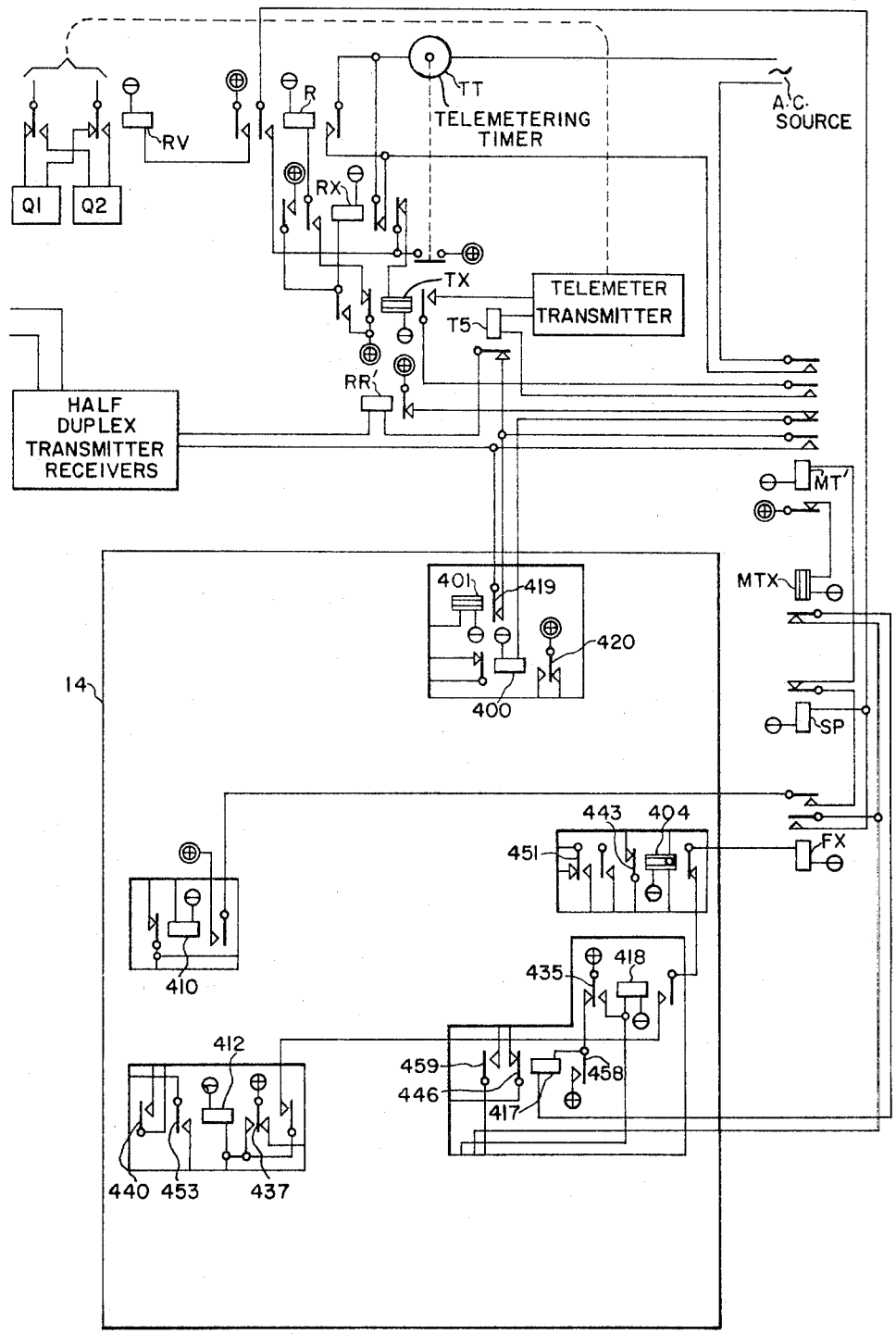

As indicated in the drawings, FIGURES 1 to 4 are similar to FIGURES 1 to 4, respectively, of the Boswau Patent No. 2,091,301. Most of the elements of the system of the Boswau patent are not shown, but are considered as contained within their respective enclosures 11 to 14. Certain relays and circuits of the system of the Boswau patent have been modified slightly, and new relays have been added in order to perform functions different from those of the apparatus of the Boswau patent. Only the modifications and the new elements are shown in the present drawings. The apparatus shown in FIGURES 1 and 2 of the drawings is located at the master or control station, and the apparatus shown in FIGURES 3 and 4 is located at the remote station or substation.

The additional apparatus at the master station comprises a telemetering receiver of the frequency type, which may be one of several different makes available commercially, a half-duplex transmitter-receiver, which is also available commercially, a receiver relay RR, a metering transfer relay MT, a loss of telemetering signal auxiliary relay ALX, metering counting relays M1 and M2, registering relays M11 and M12, metering reset relays MR and MR1, first and second metering indicating lamps and a telemetering alarm lamp.

Likewise, the additional apparatus at the remote station comprises a telemetering transmitter, a transmitter relay T5, a half-duplex transmitter-receiver, a receiver relay RR', a metering transfer relay MT', an auxiliary metering transfer relay MTX, an auxiliary point relay FX, a telemetering timer TT, a supervisory preference relay SP, a telemetering switching delay relay TX, a megavar selection relay RX, a megavar switching relay R and an auxiliary megavar switching relay RV. The functions of the various relays and their cooperation with the apparatus in the Boswau patent will be explained more fully hereinafter.

As explained in the Boswau patent, when the operator at the master station selects a certain point, for example point 1, and operates the point selection key, a point selection relay 133 at the master station and its counterpart relay 309 at the remote station are energized. These relays initiate the transfer of the channel equipment from the supervisory control equipment to the frequency type telemetering equipment.

At the remote station, the auxiliary point relay FX operates the metering transfer relay MT'. Relay MT' disconnects the carrier receiver relay RR' contact from the supervisory control receiver relay 400 and also short-circuits the supervisory control send relay 401 contact in the carrier send and receive loop. This prevents the supervisory control from utilizing the channel. Supervisory control relays 404, 418, 412 and 410 are utilized in the permissive operation of relay MT' to provide delay in operation to cause master station transfer to occur first and also to provide operation on selections from the master station only. As shown, contacts of the relays 404, 418 and 412 are in the energizing circuit for the relay FX. Contacts of the relays FX and 410 are in the energizing circuit for the relay MT'.

Other MT' contacts start the pre-set timer TT and energize the telemetering transmitter relay T5, thereby beginning transmission of the first quantity Q1 of telemetering, which is assumed to be megawatts. The timer TT may be operated by a motor energized by alternating current. After TT has timed out, a telemetering switching delay relay TX is operated to reset the timer TT and operate the megavar selection relay RX. Relay RX deenergizes the slow drop-out relay TX. Relay TX provides a delay in sequential switching to enable the positive detection of sequential telemetering switching at the master station as will be described hereinafter. When relay TX has completely dropped out, relays R and RV operate to start the new quantity Q2, megavars, to be metered. The timer TT is again started. After TT again times out, relay SP is operated to cause resetting of relay MT' and the telemetering equipment. The supervisory control is restored to the channel.

At the master station, the point selection relay 133 and a starting relay 216 operated the metering transfer relay MT. The relay MT transferred the carrier receiver relay RR contact from the supervisory control receiver relay 200 to the frequency type telemetering receiver and also short-circuited the supervisory control send relay 201 contact in the carrier send and receive loop. This prevents the supervisory control from utilizing the channel.

As described previously, remote station relay 410 permits the master station to be transferred for telemetering operation first. Therefore, the telemetering receiver when initially switched does not receive any frequency signal and its contact AL is open. Relay ALX does not pick up. Thus, relay M1 marks the first non-receipt of a telemetering signal. Where a signal is received, relay ALX operates and allows relay M11 to operate and mark receipt of the first quantity metering, megawatts. Relay M11 lights the first associated metering lamp.

After the predetermined time, the sequential telemetering switching occurs as previously described. Through the remote station relay TX delay, a non-receipt of telemetering signal drops out relay ALX and operates relay M2. Upon receiving signal for the next telemetering sequence, relay M12 operates and marks receipt of the same. The metering lamp indication is changed via dropout of relay M11 and pick-up of relay M12, thereby lighting the second associated metering lamp. When metering is completed, relay ALX again drops out and de-energizes relay MT. The relay MT resets the telemetering and restores the supervisory control to the channel. On the drawing, one indicator MA is shown for both megawatts and megavars. However, individual indications can be used and selected by relays M11 and M12.

Depending on specific requirements, the supervisory control point can remain selected, requiring manual reset or can be arranged to reset automatically after telemetering completion by adding a contact of master station relay MT to the supervisory control reset circuit.

Since the supervisory control is the prime user of the channel, it is desirable to detect a failure in the telemetering equipment if one occurs. Relay MR is a slow drop-out relay which will drop out if the time between marking of non-receipt and receipt of telemetering signal becomes abnormally long. Relays MR and MR1 will reset the master station telemetering and provide a visible and audible alarm. However, the remote station telemetering must complete the normal sequential time cycle before resetting.

If an automatic change in condition occurs during telemetering on any remote station function being supervised by the supervisory control equipment, the remote station relay SP will be operated from the existing supervisory preference reset circuit which includes the relay 147. As described previously, operation of relay SP causes reset of the remote station telemetering equipment. At the master station, a non-receipt of signal will be marked without receipt of any further signal. Therefore, relay MR will reset the master station telemetering. At the remote station relay MTX starts to drop out on telemetering reset and delays the normal supervisory preference reset of the supervisory control until the master station telemetering has reset.

From the foregoing description, it is apparent that the invention provides for operating a frequency type telemetering system and a supervisory control system over a half-duplex carrier channel which can transmit signals in only one direction at a time between a master or control station and a remote station. The telemetering from the remote station is started automatically when the operaor at the control station selects a point at the remote station by means of the supervisory control. A first quantity, such as megawatts, is metered for a predetermined time after which a second quantity, such as megavars, is metered for the predetermined time. The channel is then automatically returned to the supervisory control equipment. A change in the status condition of a supervised point at the remote station during telemetering will reset the telemetering equipment and restore the supervisory control equipment to the channel for transmission of that condition to the master station. A failure in the telemetering equipment will cause the master station telemetering apparatus to reset and provide visual and audible alarms. The present telemetering system may be utilized with supervisory control systems other than the system illustrated and described in the Boswau Patent No. 2,091,301.

Since numerous changes may be made in the above-described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. The combination with a supervisory control system having sending and receiving equipment at a control station and a remote station connected by a carrier channel capable of transmitting signals in only one direction at a time, of telemetering means at the control station and the remote station, relay means at each of said stations responsive to a signal originating at the control station and connected in circuit relation with the supervisory control equipment and telemetering means at each of the respective stations for transferring the channel from the supervisory control equipment to the telemetering means for operation of the telemetering means, timing means connected in circuit relation with the telemetering means only at the remote station for permitting operation of the telemetering means for a predetermined time interval, additional relay means connected in circuit relation with the supervisory control equipment and telemetering means at the remote station and cooperating with the timing means to return the channel to the supervisory control equipment at the expiration of said time interval, and relay means connected in circuit relation with the telemetering means at the control station responsive to the loss of telemetering signals from the remote station at the end of the time interval for resetting the telemetering equipment at the control station.

2. The combination with a supervisory control system having sending and receiving equipment at a control station and a remote station connected by a carrier channel capable of transmitting signals in only one direction at a time, of telemetering means at the control station and at the remote station, relay means at each of said stations responsive to a signal originating at the control station and connected in circuit relation with the supervisory control equipment and telemetering means at each of the respective stations for transferring the channel from the supervisory control equipment to the telemetering means for operation of the telemetering means, timing means connected in circuit relation with the telemetering means only at the remote station for permitting operation of the telemetering means for a predetermined time interval, additional relay means connected in circuit relation with the supervisory control equipment and the telemetering means at the remote station and cooperating with the timing means to return the channel to the supervisory control equipment at the expiration of said time interval, said additional relay means being responsive to a status condition change at the remote station to reset the telemetering means and transfer the channel back to the supervisory control equipment prior to the expiration of said time interval, and relay means connected in circuit relation with the telemetering means at the control station responsive to the loss of telemetering signals from the remote station at the end of the time interval for resetting the telemetering equipment at the control station.

3. The combination with a signal channel capable of transmitting signals in only one direction at a time, of supervisory control equipment at a control station and a remote station connected by said channel, frequency type telemetering means at the control station and at the remote station, transfer relay means at each of said stations responsive to a supervisory control signal originating at the control station and connected in circuit relation with the supervisory control equipment and telemetering means at each of the respective stations for transferring the channel from the supervisory control equipment to the telemetering means for transmitting telemetering signals from the remote station to the control station, and timing means connected in circuit relation with the telemetering means only at the remote station for permitting transmission of telemetering signals for only a predetermined time interval, and relay means connected in circuit relation with the telemetering means at the control station responsive to the loss of telemetering signals from the remote station at the end of the time interval for resetting the telemetering equipment at the control station.

4. The combination with a signal channel capable of transmitting signals in only one direction at a time, of supervisory control equipment at a control station and a remote station connected by said channel, frequency type telemetering means at the control station and at the remote station, transfer relay means at each of said stations responsive to a supervisory control signal originating at the control station and connected in circuit relation with the supervisory control equipment and telemetering means at each of the respective stations for transfering the channel from the supervisory control equipment to the telemetering means for transmitting telemetering signals from the remote station to the control station, timing means connected in circuit relation with the telemetering means only at the remote station for permitting transmission of telemetering signals for only a predetermined time interval, relay means connected in circuit relation with the supervisory control equipment and telemetering means at the remote station and cooperating with the timing means to return the channel to the supervisory control equipment at the expiration of said time interval, and relay means connected in circuit relation with the telemetering means at the control station responsive to the loss of telemetering signals from the remote station at the end of the time interval for resetting the telemetering equipment at the control station.

5. The combination with a signal channel capable of transmitting signals in only one direction at a time, of supervisory control equipment at a control station and at a remote station connected by said channel, frequency type telemetering means at the control station and at the remote station, transfer relay means at said stations responsive to a supervisory control signal originating at the control station and connected in circuit relation with the supervisory control equipment and telemetering means at each of the respective stations for transferring the channel from the supervisory control equipment to the telemetering means for transmitting telemetering signals from the remote station to the control station, timing means connected in circuit relation with the telemetering means only at the remote station for permitting transmission of telemetering signals for only a predetermined time interval, relay means connected in circuit relation with the supervisory control equipment and the telemetering means at the remote station responsive to a change in condition of the apparatus at the remote station to reset the telemetering means and transfer the channel back to the supervisory control equipment during said time interval, and relay means connected in circuit relation with the telemetering means at the control station responsive to the loss of telemetering signals from the remote station at the end of the time interval for resetting the telemetering equipment at the control station.

References Cited by the Examiner
UNITED STATES PATENTS

| | | | |
|---|---|---|---|
| 1,965,393 | 7/1934 | Schleicher et al. | 340—151 |
| 2,164,379 | 7/1939 | Boswau | 340—163 |
| 2,286,180 | 6/1942 | Pickles | 340—163 |
| 2,420,871 | 5/1947 | Derr | 340—163 |
| 3,048,820 | 8/1962 | Derr et al. | 340—163 |

NEIL C. READ, *Primary Examiner.*

PETER XIARHOS, A. H. WARING,
*Assistant Examiners.*